July 30, 1957   C. GAVED   2,800,685
SPLIT DIES FOR MOULDING
Filed Feb. 14, 1952
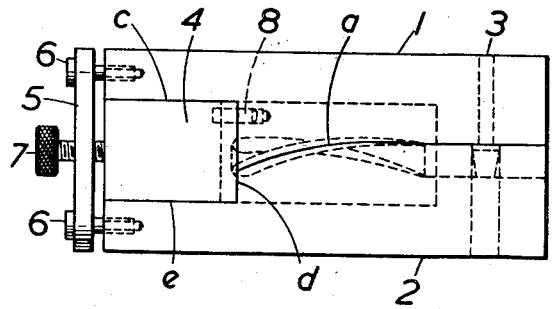
Fig. 3
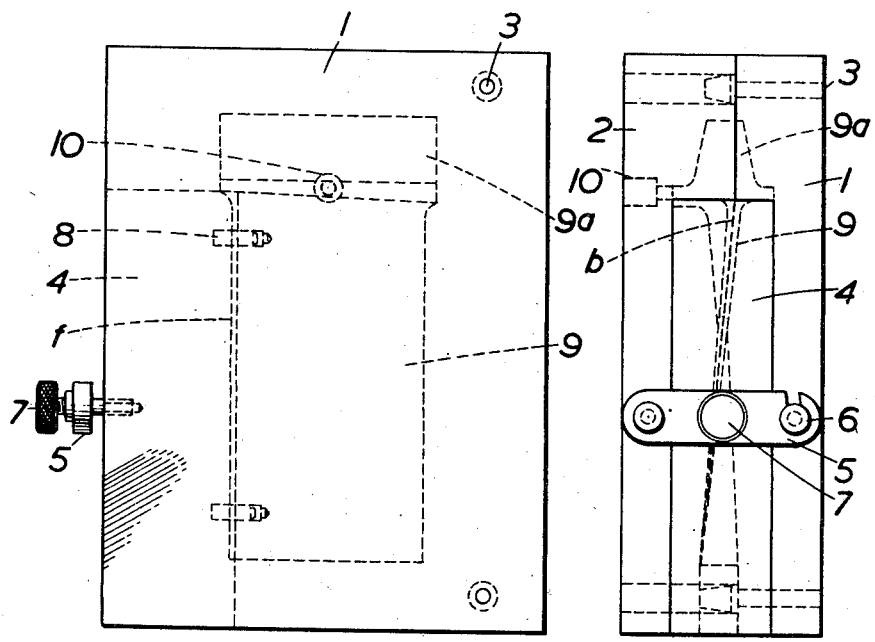
Fig. 1
Fig. 2
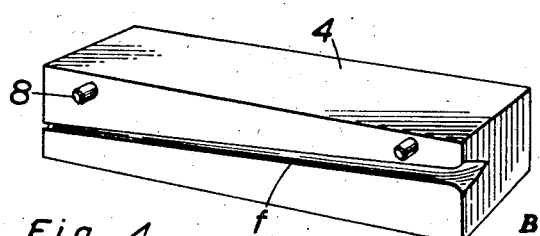
Fig. 4
Inventor
By Clement Gaved
Sturns, Davis, Miller & Mosher
Attorneys

United States Patent Office 2,800,685
Patented July 30, 1957

2,800,685
SPLIT DIES FOR MOULDING

Clement Gaved, Anstey, near Leicester, England, assignor to Power Jets (Research and Development) Limited, London, England, a British company Application February 14, 1952, Serial No. 271,613

Claims priority, application Great Britain February 21, 1951

4 Claims. (Cl. 18—42)

When an article with an accurately shaped fine edge extending along its length is moulded in an ordinary split die, the line of splitting of the die must usually lie along this edge. Consequently there is a great tendency for a small flash to be left on the moulded article along the fine edge, i. e. along the line of splitting of the die. An example is the moulding of a wax or like expendable pattern of a steam or gas turbine blade or a similarly shaped air-compressor blade for use in casting such blades by the "lost-wax" process. The wax or other material to be moulded is usually injected into a die which is split along the centre of the leading edge and along the centre of the trailing edge of the blade. Thus a small flash is almost always left along these edges on the pattern and consequently also on the casting made from the pattern. The leading edge of the blade should be smooth and of true aerodynamic form and so the flash on at least this edge must be removed. In dressing off the flash a small flat is invariably produced along the edge and to complete the forming of the article to correct shape the edge must be brought to true form by a hand or a machining operation.

The small size of the leading edge makes this reforming operation and the gauging of the edge thereafter to ensure accuracy of shape particularly difficult.

The object of the present invention is to overcome this disadvantage in moulding, by the use of an improved form of split die. According to the invention the die is split into separable parts long surfaces which do not pass through said edge; in particular, they are split along one surface extending along the cavity and across its width nearly up to the said edge and along a second surface which meets the first surface transversely at a short distance back from said edge. Preferably, the die is split into at least three parts, of which one is a block recessed to the form of the edge of the article to serve as a mould for the edge. The usual means hold the parts together, with the recessed block located in correct relationship to the rest of the die.

The surface—usually plane—along which the recessed block is split from the rest of the die cuts the surface of the mould in two opposite lines at some distance back from the edge; flashes which will appear along these lines may be harmless but they can, if necessary, be easily filed off or otherwise removed without interfering with the form of the fine edge.

An example of a die, according to the invention, for moulding a wax or other fusible pattern for an axial-flow compressor blade is shown in the accompanying drawings of which Figure 1 is a plan, Figure 2 a side elevation, Figure 3 an end elevation and Figure 4 a separate view of the block which is recessed to form the leading edge of the blade.

The mould for the blade, excluding the leading edge, is formed mainly in a die split lengthwise of the blade into an upper part 1 and a lower part 2. The division is along a surface which extends chordwise of the blade from the trailing edge towards the centre of the leading edge of the blade. The cavity forming the mould for the blade is indicated by dotted lines 9, the part forming the blade root being indicated at 9a. One end of the surface of division is indicated by the line $a$ in Figure 3. The blade is twisted, as can be seen, and so the surface of division will end, adjacent to the leading edge of the blade, in the line $b$ shown dotted in Figure 2. The upper and lower parts are relatively located in the usual way by dowels 3.

The split die so far described is that already commonly known for moulding expendable patterns for turbine and compressor blades, except that a deep channel is formed in the die by cutting away some of each of the upper part 1 and lower part 2 along the lines $c$, $d$ and $e$ seen in Figure 3. The line $d$ cuts across the mould and cuts away the part of the mould which is for the leading edge of the blade. This mould, extending along the length of the blade, is formed by the engraved recess $f$ in a block 4 which fits into the channel bounded by lines $c$, $d$ and $e$, to complete the mould; the block is accurately located by the sides of the channel, and, in the lengthwise direction, by dowel pins 8 fitting in the bottom of the channel in upper part 1 and in the engaging face of the block 4.

The means for clamping the block 4 tightly against the bottom of the channel and also holding the two half-dies 1 and 2 together may conveniently be of a type commonly used in jigs and fixtures, consisting of a removable bridge 5 extending across the outer end of the channel when the block 4 is in place, and a knurled-headed clamping screw 7; the bridge 5 can swing about one pin 6 on lower part 2 and is slotted for engaging a similar pin 6 on part 1.

One of the half-dies has the usual inlet 10 for injecting the wax or other material into the mould. After the moulding has adequately set, the clamping pressure is removed from the block by unscrewing the screw 7; the bridge 5, being thus unclamped, is swung out of the way about the pin 6, and the three parts 1, 2 and 4 of the die separated to allow the moulding to be taken out. There will be flashes left on the moulding along the lines where it passes through the bottom of the channel but these are easily removable without affecting the shape of the edge.

I claim:

1. A split die having therein a cavity in the form of a mould of a turbine or axial-flow compressor blade, the die consisting of a main portion separable into two parts along a surface extending chordwise through the blade along its length and recessed on their interengaging faces to form respectively concave and convex cavity walls defining in combination a mould for all but the leading edge of said blade, said main portion having therein an open sided channel—lying to one side of said recess and partly in each of the two separable parts—extending from an edge of the die up to and just beyond the leading edge of the blade, a block recessed for forming the leading edge of said blade, fitting into the said channel, means locating the said block and the other said parts relatively to one another and means for clamping said recessed block in place in said channel and for permitting its release laterally thereof.

2. A split die having therein a cavity in the form of a mould of a turbine or axial-flow compressor blade, the die consisting of a main portion separable into two parts along a surface extending chordwise through the blade along its length and recessed on their interengaging faces to form respectively concave and convex cavity walls defining in combination a mould for all but the leading edge of said blade, a block abutting on said main portion and recessed to the form of the leading edge of the blade, said parts defining said main portion including channel forming extensions embracing said block and means for clamping the latter in place within said channel and for permitting its release laterally thereof.

3. A split die having therein a cavity in the form of a turbine or compressor blade, the die comprising at least three longitudinally extending separable parts including first and second parts separable in a transverse direction and each having a curved surface thereon, means for relatively locating said first and second parts with said curved surfaces opposed to one another and spaced to partly form a mould cavity, said curved surface on the first part having a concave profile in transverse section and said curved surface on the second part having a convex profile in transverse section, a third part which is recessed to provide a longitudinal groove of curved profile in transverse section, and means for locating said third part in relation to at least one of said first and second parts with said groove aligned with respect to said three separate parts to form a continuous mould cavity therein.

4. A die according to claim 3, wherein said third part includes a longitudinally extending surface provided with a recess to define said groove, said locating means for said third part including respective abutting surfaces complementary thereto on said first and second parts, and said first and second parts include mutually abutting surfaces which extend longitudinally therebetween and substantially transversely to said complementary abutting surfaces to assist in relatively locating said first and second parts.

References Cited in the file of this patent

UNITED STATES PATENTS

| | | |
|---|---|---|
| Re. 10,397 | Ripley | Oct. 23, 1883 |
| 242,638 | Hatch | June 7, 1881 |
| 488,570 | Miller | Dec. 27, 1892 |
| 1,401,255 | Hibbs | Dec. 27, 1921 |
| 1,646,592 | Parker | July 11, 1922 |
| 1,543,701 | Dickey | June 30, 1925 |
| 1,687,797 | Sachse | Oct. 16, 1928 |
| 2,262,053 | Schultz | Nov. 11, 1941 |
| 2,323,014 | De Laney | June 29, 1943 |
| 2,473,284 | Knaggs | June 14, 1949 |